Aug. 12, 1958 — E. BAUMANN — 2,846,692
TRANSPORTABLE DOMESTIC SUDATORIUM
Filed April 7, 1955 — 3 Sheets-Sheet 1

INVENTOR
ERNST BAUMANN
BY Toulmin & Toulmin
ATTORNEYS

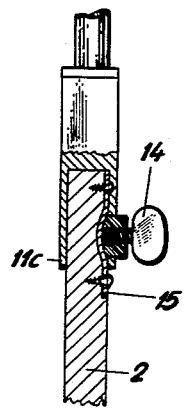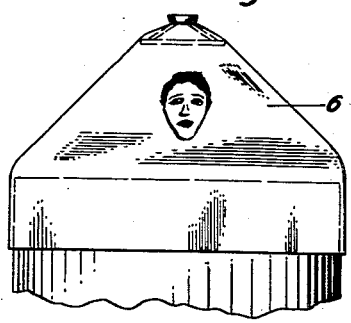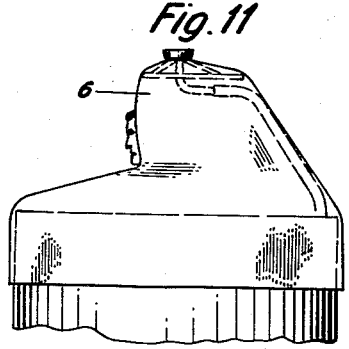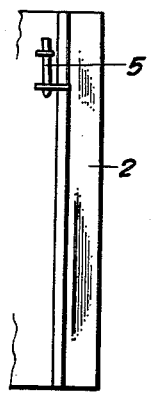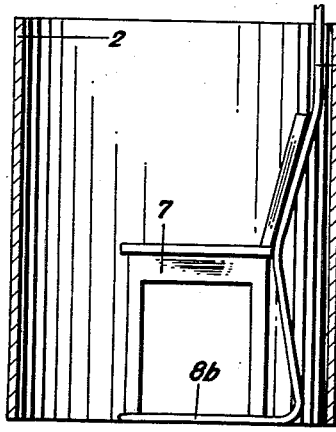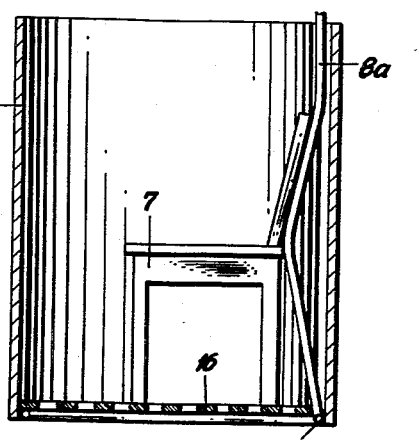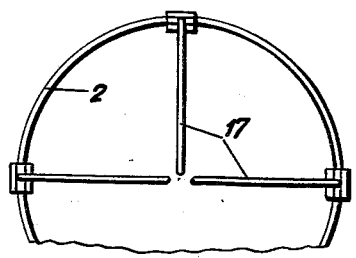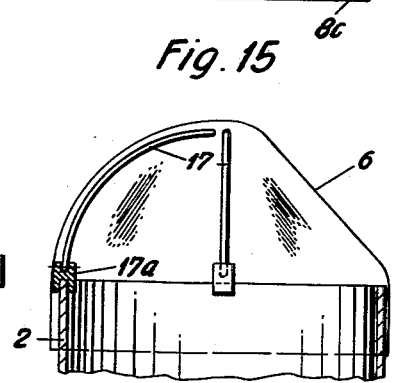

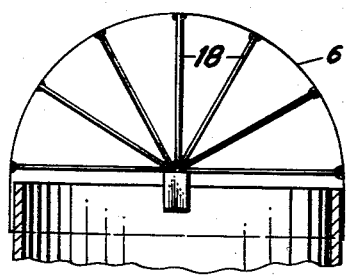
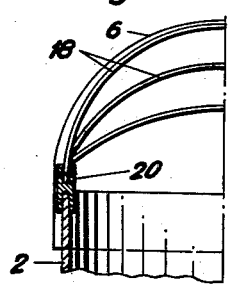
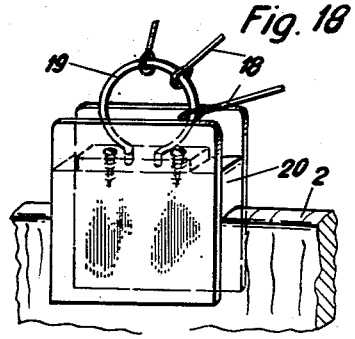
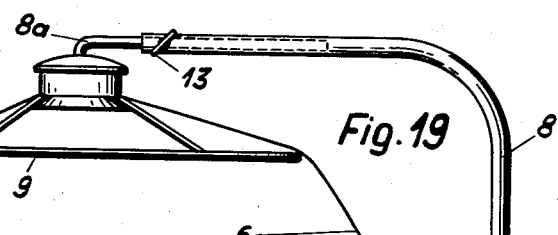
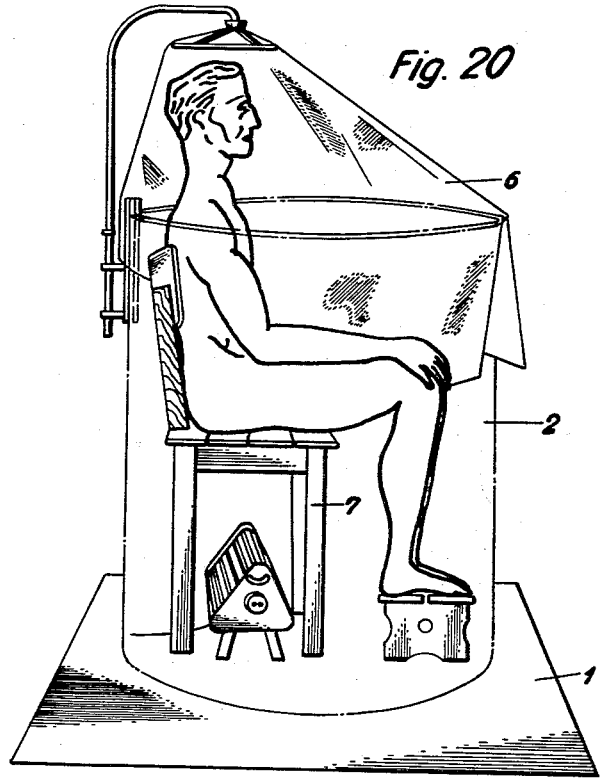
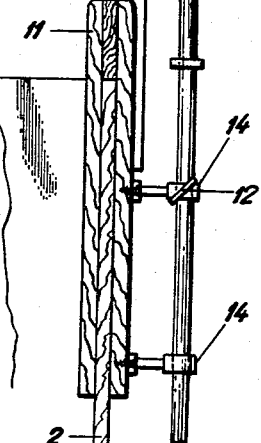

United States Patent Office
2,846,692
Patented Aug. 12, 1958

2,846,692
TRANSPORTABLE DOMESTIC SUDATORIUM
Ernst Baumann, Basel, Switzerland
Application April 7, 1955, Serial No. 499,987
Claims priority, application Switzerland April 9, 1954
4 Claims. (Cl. 4—160)

The present invention relates to a transportable domestic sudatorium with an enclosed compartment which consists, on the one hand, of an erectable and closable roller wall and, on the other hand, of a top bell-type closing cover. The sudatorium according to the present invention is characterized by the fact that the bell-type closing cover is made of flexible material and that a holding device with at least one supporting member is provided to hold the topmost part of the closing cover above the roller wall. If the holding device is appropriately designed, the user of the sauna can be entirely inside the enclosed compartment without touching the bell-type cover. The user will then, as experience has shown, have the beneficial feeling of not being in a narrow cabinet, but in a larger compartment.

The bell-type closing cover is suitably slotted in its vertical central plane, it being possible to hold the edges of the slot together by means of a releasable closure. If the cover is appropriately designed, the user can then pass his face or his entire head through the slot when in the predetermined bathing position, whereas the remaining part of the slot can be closed.

Various typical embodiments of the domestic sudatorium according to the invention are illustrated in the attached drawing, in which.

Figure 5:
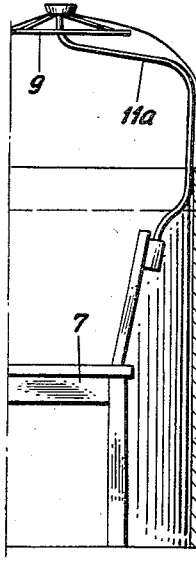
Figure 6:
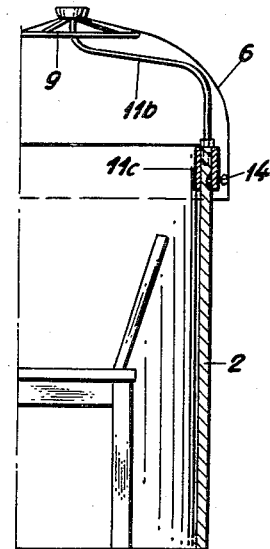

Figs. 5 and 6 each show a further embodiment in vertical section through the longitudinal central plane;

Fig. 7 shows a detail of Fig. 6 on an enlarged scale;

Figs. 8 and 9 are a front and side view of a section of the roller wall;

Figs. 10 and 11 are two views of an alternative embodiment of the bell-type closing cover;

Figs. 12–15 each show a further alternative embodiment of the holding device for the cover;

Figs. 16 and 17 are two views of another embodiment of the holding device, while, Fig. 18 shows a detail of this holding device on an enlarged scale;

Fig. 19 shows a further embodiment of the holding device and,

Fig. 20 is a general view of the domestic sauna with the holding device according to Fig. 19.

Figure 1:
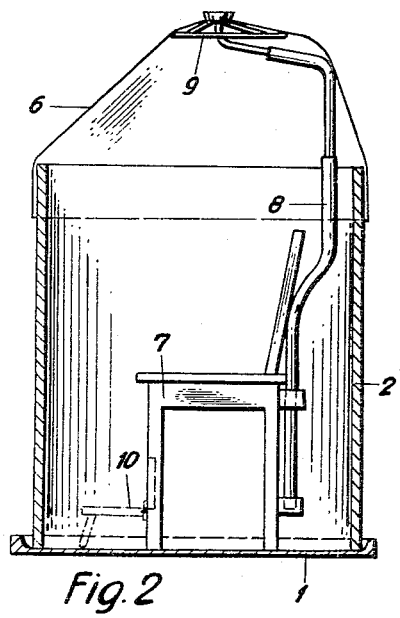
Fig. 1 shows a first typical embodiment in vertical section through the longitudinal central plane.
Figure 2:
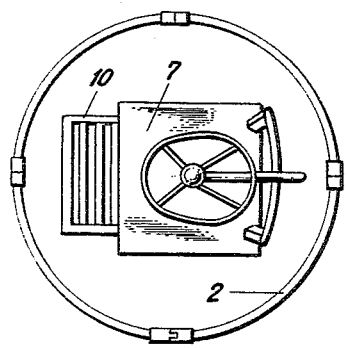
Fig. 2 is a top view of the same embodiment without the bell-type closing cover.

In the typical embodiment according to Figs. 1 and 2 a roller wall 2, which is enclosed to form a cylinder, is erected vertically on a waterproof and washable base 1 arranged on the floor. This wall 2 is suitably made of moisture-proof, vertically erected wooden boards 3 (Fig. 9) which are flexibly interconnected by means of stainless steel sides 4. As shown in Fig. 8 the two ends of the roller wall 2 can be interconnected by means of a pin 5, the latter being inserted in axially aligned holes which are provided in butt straps arranged on each wall end.

A twice-bent rod 8 is releasably secured to the chair 7 as holding device for the bell-type cover 6. This rod projects upwards from the inside of the roller wall 2 and carries a plate-shaped supporting member 9 on its top free end. The member 9 serves to support the topmost and central part of the bell-type cover 6 which is formed by a flexible shell which hangs down over the roller wall for a certain distance.

The chair 7 is placed inside the roller wall 2, i. e. inside the enclosed compartment formed by this wall and the cover 6. A foot rest 10 may be set in front of the chair. An electric heater, not shown, is placed between the chair legs and is suitably provided with three-stage control so that the heat supply desired can be set. As can be seen from Fig. 1, the plate-shaped supporting member 9 is located approximately above the head of a person sitting on the chair 7, the back of the latter enabling the said person to sit in a comfortable position. The height of the plate 9 is chosen such that a person sitting on the chair 7 does not come into contact with the cover 6 at any point. Since the bottom edge of the cover 6 fits closely to the top edge of the roller wall 2 from the outside, a relatively tightly sealed compartment is achieved.

Figure 3:
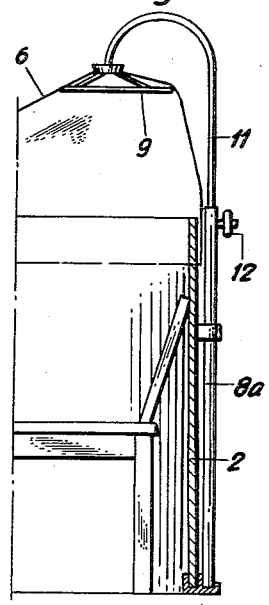
Fig. 3 shows a second embodiment and Fig. 4 a third, both in vertical section through the longitudinal central plane.

The embodiment according to Fig. 3 differs from the one just described in that a hollow column 8a arranged outside the roller wall serves as holding device for the cover 6. Inserted in the top end of the said column is a rod 11 which, in turn, carries the plate-shaped supporting member 9 on its free end. This plate 9 is located, as in the first embodiment, inside the cover 6. A lock-screw 12 enables the height of the plate 9 to be set so that even a tall person does not come into contact with the cover 6 at any point. The plate 9 may also be laterally displaceable. It is located behind the vertical axis of the wall 2.

Figure 4:
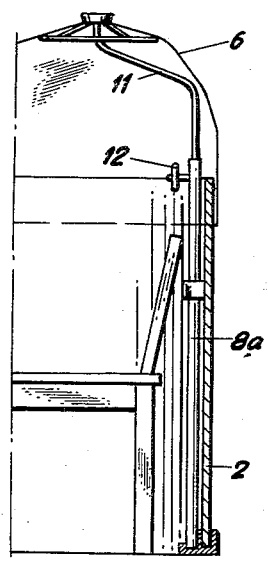
Fig. 4a shows a detail of Fig. 4 on an enlarged scale.
Figure 4A:
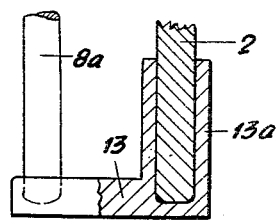

The embodiment according to Fig. 4 is similar to that of Fig. 3, except that here the column 8a and the rod 11a are inside the enclosed compartment formed by the roller wall 2 and the cover 6. An annular base 13 accommodates the bottom edge of the roller wall 2 in a groove 13a; column 8a is also supported on the base 13 (Fig. 4a).

The embodiment according to Fig. 5 differs from that of Fig. 4 in that the rod 11a is not supported by a column but by the back of the chair 7. The fastening can once again be so arranged that the plate 9 is vertically adjustable.

According to Fig. 6 a rod 11b, the upper part of which has exactly the same shape as the rod 11a in Fig. 5, serves as carrier for the plate 9. The bottom end of the rod 11b is shaped as a fork 11c. The latter is mounted on the top edge of the roller wall 2 and has, in its outer leg, a threaded bore into which a clamping screw 14 is screwed to lock the rod 11b in position on the roller wall 2. According to Fig. 7 the relevant point on the roller wall 2 is provided with a metal stiffening strip 15 on which the clamping screw 14 acts when tightened.

Figs. 10 and 11 illustrate a closing cover 6 having an opening through which the bather can pass his face. As the cover 6 is flexible, it can be easily folded into the shape shown in Figs. 10 and 11. The opening in the cover may be closable, e. g. by means of a zip fastener, so that the user is completely inside the enclosed compartment without touching the cover 6 at any point.

According to Fig. 12 the column 8a is provided with a forked foot 8b, the two sides of which are accommodated in suitable recesses on the outside of the chair legs.

In the embodiment according to Fig. 13 the column 8a ends at the bottom in a ring 8c which is tightly enclosed by the roller wall 2. A duckboard 16 is supported on the ring 8c.

In the embodiment according to Figs. 14 and 15 three bent rod-like carriers 17 are provided as holding device for the cover 6. Each of these carriers 17 is held on the top edge of the roller wall 2 by means of a slider 17a. The sliders 17a are so adjusted that they are locked by a clamping action. The carriers 17 are staggered in respect of each other by 90° so that they support the cover 6 evenly in the manner illustrated in Fig. 15. The middle carrier 17 is at the rear.

In the emodiment according to Figs. 16–18 the holding device for the top closing cover 6 is formed by bars 18 bent in a semi-circle. The bar ends are each held by a ring 19 which is secured to a slider 20. The two sliders 20 are hooked over the top edge of the roller wall 2 on opposite sides. The bars 18 can be closed and opened like a fan, in the same way as a perambulator hood, about a horizontal axis. The central part of the cover 6 assumes a hemispherical configuration on the opened bar framework.

The transportable domestic sauna illustrated in Fig. 20 has an enclosed compartment which consists, on the one hand, of the roller wall 2, vertically erected on the base 1, and, on the other hand, of the top bell-type closing cover 6. The latter is formed by a shell made of flexible material which hangs down over the top part of the roller wall 2. A holding device, illustrated on an enlarged scale in Fig. 19, holds the topmost part of the cover 6 above the roller wall 2. It is thus possible for a person sitting on a chair 7 to be completely inside the enclosed compartment without coming into contact with the cover 6. An electric heater located under the chair supplies the heat for the sauna.

The holding device comprises a column formed by a metal tube 8 and a rod 8a. The metal tube 8 extends vertically in its lower part and horizontally in its top part. The rod 8a, which is telescopically displaceable in the tube 8, carries a plate-shaped supporting member for the cover 6. The mounting of the plate 9 projects outwards through an opening in the topmost part of the cover, the plate 9 is thus located inside and the column 8, 8a outside the bell-type closing cover 6. The bottom end of the tube 8 is connected to a wooden slider 11 which is placed on the top edge of the roller wall 2 and is self-clamping. Secured to the slider 11 are two bearing members 14 through which the tube 8 is passed and locked by means of a screw 12.

When the screw 12 is loosened, the rod 8 and thus the supporting member 9 can be displaced in a vertical direction. The plate 9 can also be adjusted horizontally by displacing the rod 8a in the horizontal part of the tube 8. A screw 13 serves to lock the rod 8a.

Owing to the fact that the supporting plate 9 is adjustable both vertically and horizontally, the position of the bell-type closing cover 6 can be satisfactorily adapted to the height and wishes of the person sitting in the sudatorium.

While I have herein described, and illustrated in the accompanying drawing what may be considered a typical and particularly advantageous embodiment of my said invention, I wish it to be understood that I do not limit myself to the particular details and dimensions described and illustrated, for obvious modifications will occur to a person skilled in the art.

What I claim as my invention and desire to secure by Letters Patent, is:

1. A transportable domestic sudatorium comprising a base, an erectable and closable roll-up wall on said base comprising a plurality of flexibly interconnected vertical wooden boards forming an enclosed compartment with an open top, a bell-like cover made of flexible material for fitting over the open top of said enclosed compartment and extending downwardly over a portion of the roll-up wall, a supporting frame to support the topmost and central portion of said bell-like cover, a substantially vertical rod with the upper end curved toward said supporting frame and connected thereto, a hollow column mounted on said roll-up wall and slidably receiving the vertical portion of said rod, and a clamp on said hollow column for locking said rod in said column to adjust the height of the supporting frame and the cover so that an occupant of the enclosed compartment will not come into contact with the cover at any point.

2. A transportable domestic sudatorium comprising a base, an erectable and closable roll-up wall on said base comprising a plurality of flexibly interconnected vertical wooden boards forming an enclosed compartment with an open top, a bell-like cover made of flexible material for fitting over the open top of said enclosed compartment and extending downwardly over a portion of the roll-up wall, a supporting frame to support the topmost and central portion of said bell-like cover, a substantially vertical rod with the upper end curved toward said supporting frame and connected thereto, and a clamp on said roll-up wall for securing the vertical portion of said rod and positioning the supporting frame and the cover so that an occupant of the enclosed compartment will not come into contact with the cover at any point.

3. A transportable domestic sudatorium comprising a base, an erectable and closable roll-up wall on said base comprising a plurality of flexibly interconnected vertical wooden boards forming an enclosed compartment with an open top, a bell-like cover made of flexible material for fitting over the open top of said enclosed compartment and extending downwardly over a portion of the roll-up wall, said bell-like cover having a slot in a vertical longitudinal central plane with said slot indicating the front of the sudatorium, there being releasable closures on the edges of said slot so that the occupant can pass at least his face through the slot when using the sudatorium, a supporting frame to support the topmost and central portion of said bell-like cover, a substantially vertical rod with the upper end curved toward said supporting frame and connected thereto, and a clamp on said roll-up wall for securing the vertical portion of said rod and positioning the supporting frame and the cover so that an occupant of the enclosed compartment will not come into contact with the cover at any point except as his face passes through the slot.

4. A transportable domestic sudatorium comprising a base, an erectable and closable roll-up wall on said base comprising a plurality of flexibly interconnected vertical wooden boards forming an enclosed compartment with an open top, a bell-like cover made of flexible material for fitting over the open top of said enclosed compartment and extending downwardly over a portion of the roll-up wall, a chair within said enclosure for the occupant thereof, a supporting frame to support the topmost and central portion of said bell-like cover, and a substantially vertical rod with the upper end curved toward said supporting frame and connected thereto, the vertical portion of said rod being attached to said chair, said rod being of such a height that the occupant of the chair does not come into contact with the cover supported by said supporting frame.

References Cited in the file of this patent

UNITED STATES PATENTS

| Re. 1,816 | Palmer | Nov. 8, 1864 |
| 202,748 | Overfield | Apr. 23, 1878 |
| 459,764 | Orr | Sept. 22, 1891 |
| 558,857 | Sternkopf | Apr. 21, 1896 |
| 577,297 | Harding | Feb. 16, 1897 |
| 641,353 | Wygal | Jan. 16, 1900 |
| 828,733 | Fuller | Aug. 14, 1906 |
| 1,120,224 | Murray | Dec. 8, 1914 |
| 1,932,788 | Keating | Oct. 31, 1933 |
| 2,041,852 | Metzger | May 26, 1936 |
| 2,194,668 | Morrison | Mar. 26, 1940 |
| 2,526,733 | Cosper | Oct. 24, 1950 |

FOREIGN PATENTS

| 87,304 | Switzerland | Mar. 1, 1921 |